United States Patent
Muir

[15] 3,684,961
[45] Aug. 15, 1972

[54] DISPLACEMENT TRANSDUCER WITH INDUCTIVE SENSING HEAD AND MEANS PROVIDING SEPARATE DISPLACEMENT AND DIRECTION SIGNALS

[72] Inventor: Douglas William Ballantyne Muir, Penicuik, Scotland

[73] Assignee: Irvine Findlay Limited, Penicuik, Scotland

[22] Filed: Oct. 2, 1970

[21] Appl. No.: 77,417

[30] Foreign Application Priority Data

Oct. 6, 1969 Great Britain..........49,045/69

[52] U.S. Cl..................324/34 D, 318/653, 318/656, 336/45, 340/199
[51] Int. Cl. .............................................G01r 33/00
[58] Field of Search .....324/34 D, 34 PS; 336/30, 45; 340/195, 199, 282; 318/653, 656, 657

[56] References Cited

UNITED STATES PATENTS 3,346,807 10/1967 Wood et al. .................324/37
3,477,027 11/1969 Jablonski...................340/199

*Primary Examiner*—Robert J. Corcoran
*Attorney*—Kemon, Palmer & Estabrook

[57] ABSTRACT

A displacement transducer suitable for use in an automatic transfer machine includes an inductive sensing head the output of which is used to generate an indicating signal of a polarity and magnitude indicative of the direction and extent of the displacement of a displaceable member relative to a datum. The transducer also includes a further circuit responsive to the output of the sensing head to generate a further signal whenever the displacement is within a predetermined range of the datum, the further signal being used to gate the indicating signal, and the resultant being applied to a bistable store so that the store indicates the sense of the displacement even beyond the normal operating range in which the indicating signal is generated. The further signal may also be applied through a feedback loop to control the amplitude of the indicating signal to compensate for changes in the gap between the sensing head and the displaceable member.

8 Claims, 3 Drawing Figures

DISPLACEMENT TRANSDUCER WITH INDUCTIVE SENSING HEAD AND MEANS PROVIDING SEPARATE DISPLACEMENT AND DIRECTION SIGNALS

The present invention relates to displacement transducers and is concerned particularly, though not exclusively, with displacement transducers for use in indicating the position of, or for positioning, a tool in relation to a workpiece, or a workpiece in relation to a tool.

Such transducers are in use particularly in what are known as automatic transfer machines and are effective for operation over a narrow predetermined range of displacement. When this range is exceeded no indication or control is provided.

According to the present invention there is provided a displacement transducer comprising a displaceable member adapted for displacement relative to a sensing head, first means responsive to output from the sensing head to provide an indicating signal of a polarity and magnitude respectively indicative of the direction and extent of the displacement within a predetermined range of the displaceable member relative to a reference position, second means responsive to output from the sensing head to provide a further signal indicative of the proximity of the displaceable member to the reference position, and means arranged to combine the two signals in such a manner as to provide an output signal indicative of the direction of the displacement irrespective of displacement of the displaceable member out of the said predetermined range. Thus by means of the said output signal the direction in which the displaceable member needs to be moved to bring it into the predetermined range is indicated and this obviates the need for initial manual adjustment in, for example, servo-controlled positioning systems. The further signal may also be used to control the amplitude of the indicating signal in such a manner as to compensate for changes in the gap between the displaceable member and the sensing head.

The invention will now be described in more detail, by way of example, with reference to the accompanying drawings in which.

Figure 1:
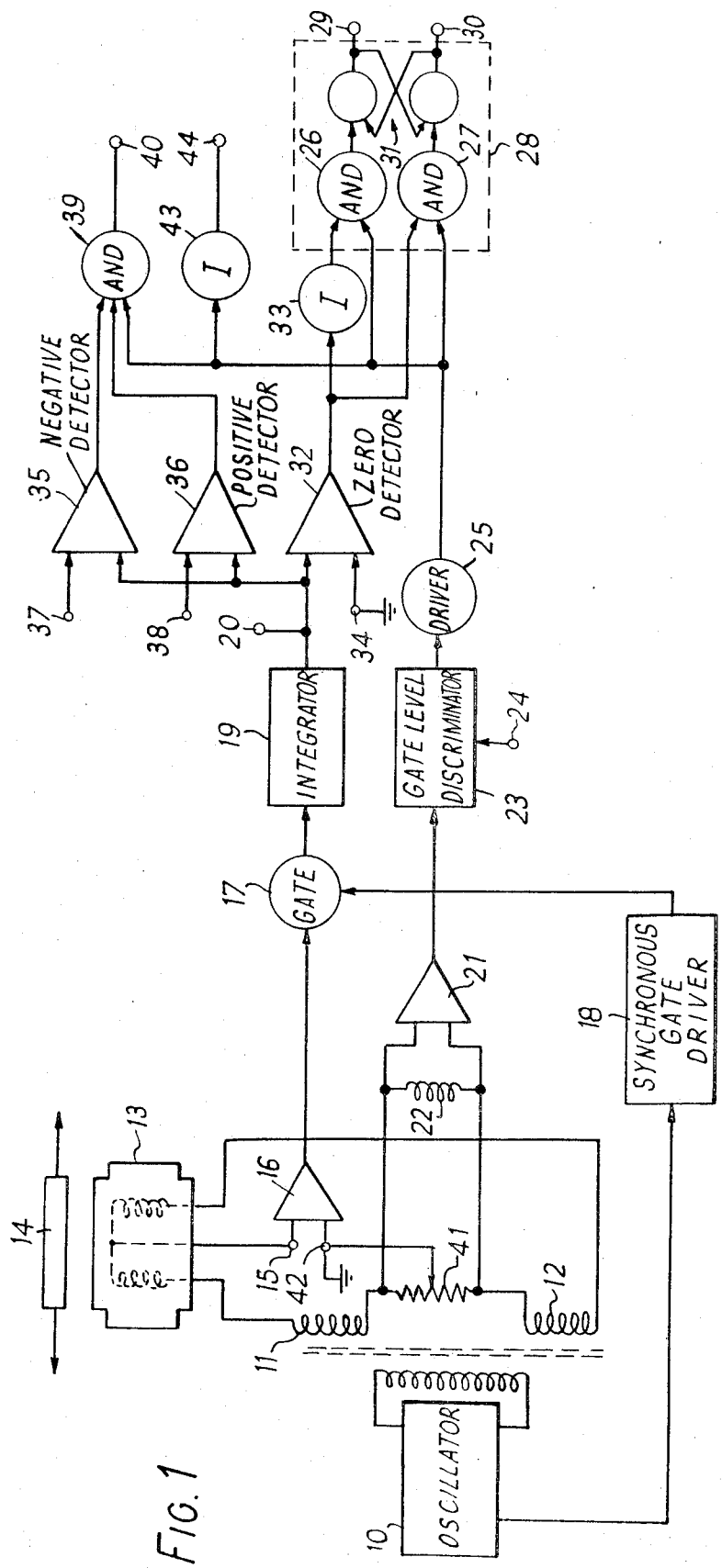
FIG. 1 is a block circuit diagram of a displacement transducer for use in indicating the position of, or in positioning, a tool relative to a workpiece.

In FIG. 1 an oscillator 10 has an output transformer with two secondary windings 11 and 12 connected to two windings of a sensing head 13. The transformer may alternatively form part of the oscillator and carry a further, feedback winding. The sensing head uses differentially variable reluctance in the magnetic circuit of the two windings in the head. The reluctance is varied in this fashion by a displaceable member 14 which is of ferro-magnetic material and can be displaced across a face of the sensing head. The two windings in the head 13 and the secondary windings 11 and 12 are connected in a bridge circuit, so that there is one position of the member 14 referred to herein as the reference position, for which the impedances of the two windings in the head are equal and the output from the head at terminal 15 is zero. With movement of the member 14 away from the reference position the A.C. signal at terminal 15 grows in amplitude to a maximum and is of one phase for one direction of displacement from the reference position and of the opposite phase for displacement in the opposite direction from the reference position.

This displacement-indicating signal is amplified by an amplifier 16 and applied to a synchronous gate 17 which is opened for the duration of each of the positive half-cycles by a drive from the oscillator 10 through a gate-driver 18, and operates as a phase discriminator. Thus the output of the gate 17 consists of negative half-cycles or positive half-cycles of the output from the head 13 depending upon the direction of the displacement of the member 14 from the reference position. The amplitude of the half-cycles appearing at the output of the gate 17 is dependent upon the extent of the displacement of the member 14 from the reference position.

An integrator 19 is connected to integrate the output from the gate 17 and provide a demodulated D.C. output of which the magnitude and sign at any instant is indicative of the extent and direction respectively of the displacement of the member 14 from the reference position. An output terminal 20 is provided for connection to a recorder, indicator or servo-mechanism for controlling the position of the member 14.

Figure 2:
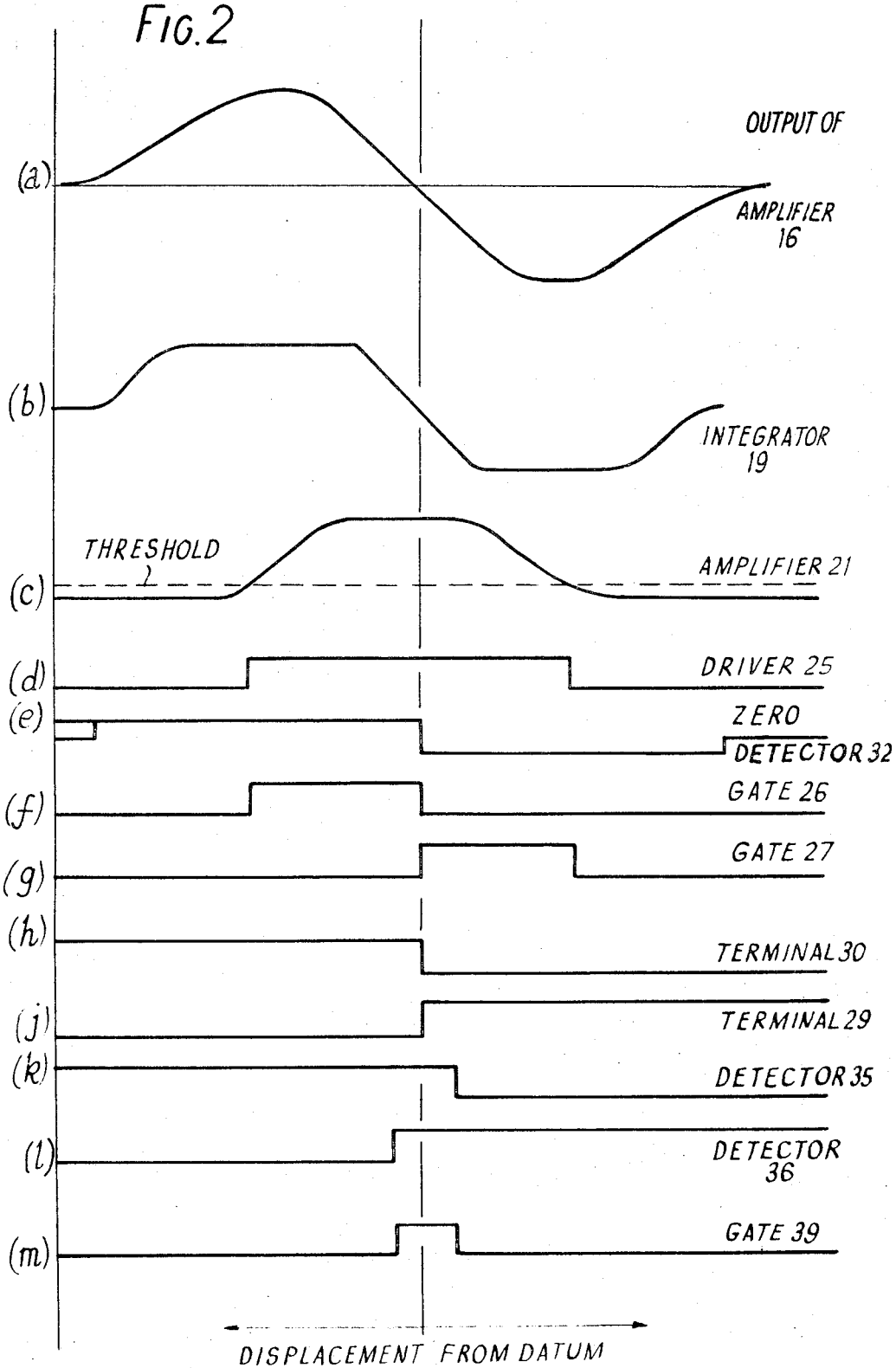
FIG. 2 is a waveform diagram showing some of the waveforms present in the transducer of FIG. 1.

The output of the amplifier 16 consists of a carrier modulated by waveform $a$ of FIG. 2, which is seen to rise to a maximum on either side of the reference position and then return to zero as the member 14 goes beyond the range of operation of the transducer. Likewise the output $b$ of the demodulator-integrator 19 returns to zero outside this range, and thus indication or control can only be provided within a preset operating range.

The transducer shown in FIG. 1, however, also includes a proximity detector including an amplifier 21. The input to the amplifier 21 is derived from an inductor or choke 22 connected across a potentiometer 41 between the secondary windings 11 and 12. The current flowing through the inductor 22, and hence the voltage developed across it, is dependent upon the total current flowing through the secondary windings 11 and 12, which in turn is dependent upon the total impedance of the sensing head 13. This impedance reaches a maximum when the member 14 reaches the reference position from either direction.

The output $c$ from the amplifier 21 is fed to a gate-level discriminator 23 to which a reference voltage is applied from a terminal 24. The discriminator is arranged to provide an output when the input thereto from the amplifier 21 exceeds the reference threshold voltage from 24. This is arranged to occur when the member 14 is displaced from the datum position by 0.4375 inch in either direction, i.e. the total range of this zone is 0.875 inch. A gate driver 25 is energized by the discriminator 23 and provides an output $d$ in FIG. 2 whenever the member 14 is in this proximity zone. This output is applied to two AND-gates 26 and 27 in a unit 28.

The unit 28 provides, at two output terminals 29 and 30, output signals which indicate the direction in which the member 14 is displaced from the reference position. For this purpose a bistable circuit 31 comprising two cross-coupled NOR-gates is driven from the AND-gates 26 and 27. As described, one input for each of the AND-gates comes from the gate-driver 25. The other input to the gate 27 is from a zero detector 32, and the other input to the AND-gate 26 is from an inverter 33 driven by the zero detector 32. The zero detector 32 is provided with a zero reference from a terminal 34 shown as connected to earth, and when the member 14 is in the normal operating range of the transducer the detector provides an output $e$ in FIG. 2 which is of one polarity when the member 14 is displaced on one side of the reference position and of the opposite polarity when the member 14 is displaced on the opposite side of the reference position.

AND-gate 26 or AND-gate 27 provides an output, as shown in waveforms $f$ and $g$, in dependence upon the direction in which the member 14 is displaced from the reference position, and the bistable circuit 31 is driven to one of its two states accordingly. Once the bistable circuit 31 has been set in either of its states it will remain in that state however far the member 14 continues to move away from the reference in the same direction, and hence even though its movememt should take it outside the 0.875 inch proximity zone defined by the discriminator 23 the store will continue to indicate the direction in which the member 14 is to be moved to bring it back into the operative range. The bistable circuit 31 will require a cycle of operation when it is first switched on to ensure it supplies the correct output.

In addition to the signals $h$ and $j$ provided at terminals 30 and 29 respectively by the bistable 31, and the displacement-indicating output signals at 20, the transducer shown in FIG. 1 provides null signals when the tool is within predetermined close limits of the reference position. To achieve this the output of the integrator 19 is additionally applied to two detectors 35 and 36. The detector 35 is provided with a negative reference voltage from a terminal 37 and the detector 36 with a positive reference voltage from a terminal 38.

The output $k$ of the detector 35 is normally positive and switches to negative only when the signal at its input from the integrator 19 is negative and in excess of the negative reference. The output $l$ of the detector 36 is normally positive and switches to negative only when the output from the integrator is positive and exceeds the positive reference.

Thus, if the output from the integrator 19 lies between the positive and negative references, both detectors will have positive outputs. When the output from the integrator lies outside this range one of the detectors 35 and 36 provides a negative output. The outputs of the detectors 35 and 36 are applied to an AND-gate 39 together with the output of the gate driver 25, and thus for a null signal $m$ to appear at the output 40 of the gate 39, the member 14 must be in the 875 inch proximity zone defined by the output of the gate driver 25, and it must also be in the null zone which causes the output of the integrator 19 to lie between the negative and positive reference voltages applied to the detectors 35 and 36 respectively.

The width of the null zone can be varied by varying the values of the reference voltages applied to the detectors 35 and 36, and in one example it is made variable in steps representative of a null zone width of ±0.001 inch, ±0.0025 inch, ±0.005 inch and ±0.0075 inch.

The location of the reference position of the member 14 at which the output of the integrator 19 is zero is also made variable by means of the potentiometer 41 connected between the windings 11 and 12. The wiper of the potentiometer 41 is connected to an earth terminal 42 connected to one input of the amplifier 16. Thus with the wiper of the potentiometer 41 in its central setting no fraction of the voltage across it is injected into the amplifier 16. With the wiper offset in one sense or the other there is injected into the amplifier 16 a fraction of the oscillation across the inductor 22 of a phase dependent upon the sense of the offset. Thus the reference position of the member 14 giving zero output from the integrator 19 becomes that position in which the output of the sensing head exactly counteracts the oscillation injected into the amplifier 16 from the potentiometer 41.

An output from the gate-driver 25 is inverted in an inverter 43 and applied to an output terminal 44.

Thus the outputs of the integrator 19 at the terminal 20, the gate 39 at the terminal 40, the inverter 43 at the terminal 44 and the bistable circuit 31 at the terminals 29 and 30 are available for purposes such as indicating, recording and controlling the position of the member 14 relative to the reference position.

The member 14 consists of mild steel slug and will normally be mounted upon or coupled to a tool or workpiece to be positioned at the reference.

The transducer of FIG. 1 may be modified to compensate automatically for the effect of changes in the gap between the sensing head 13 and the member 14. A feedback loop (not shown) is provided which peak rectifies the output of the proximity amplifier 21, sums the rectified signal with a reference, and uses the resultant to control the current supplied from a voltage source to the oscillator 10. The variation in supply will cause a corresponding variation in the amplitude of the oscillator output to compensate for changes in the gap, i.e. an increase in the gap will increase the amplitude and a decrease in the gap will decrease the amplitude.

Figure 3:
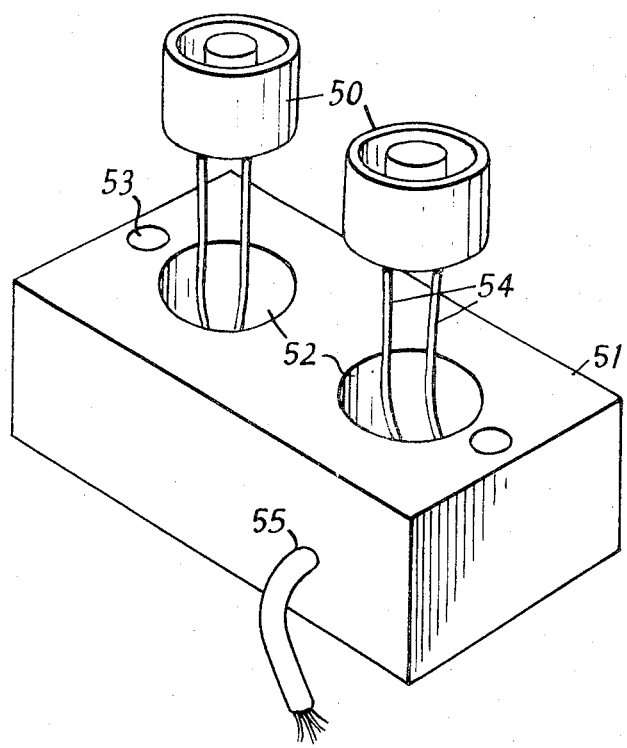
FIG. 3 shows the sensing head of FIG. 1 in the partially assembled state.

The construction of the sensing head 13 will now be described with reference to FIG. 3. The two coils are wound on coil formers 50 and placed in a casing 51. The casing is formed of stainless steel and includes two bores 52 for receiving the coils, and two bores 53 for receiving fixing members such as screws. The coils 50 are inserted into the bores 52 with the coil leads 54 extending through channels (not shown) leading from the inner ends of the bores 52 to a hole 55 in the side of the casing. Before insertion into the bores 52, the coils 50 have applied to the bottom of their peripheral surface an adhesive filler, preferably an epoxy resin such as that sold under the trade name "Araldite." The tops of the coil formers 50 then stand just below the surface of the casting 51. The tops of the coils are covered with more resin until flush with the surface of the casing, and when the resin has hardened the top surface of the casing, is accurately ground down to within a predetermined distance of the tops of the coils. In this way extreme accuracy can be obtained with a relatively inexpensive form of construction.

I claim:

1. A displacement transducer comprising:
a sensing head;
a member displaceable relative to said sensing head;

said sensing head including two coils the respective impedances of which are determined by the position of the said member relative to the said sensing head;

means for energizing said sensing coils;

differential output means coupled to said sensing head coils and responsive to displacement of said member relative to said sensing head to provide an indicating signal of a polarity and magnitude respectively indicative of the direction and extent of the displacement within predetermined limits of displacement from a reference position of said displaceable member relative to said sensing head;

proximity output means coupled to said sensing head coils and responsive to the total impedance of said sensing head coils to provide a proximity signal indicative of whether the displaceable member is present within a region between the said limits and containing the said reference position;

and means arranged to combine said indicating and proximity signals to provide an output signal indicative of the direction of said displacement irrespective of displacement of said displaceable member beyond said predetermined limits.

2. A transducer according to claim 1, wherein said combining means includes a bistable circuit, and means for applying said indicating signal to said circuit when said displaceable member is disposed between said limits.

3. A transducer according to claim 1, wherein said sensing head coils are mounted in a casing, the top surface of said coils being below the surface of said casing and the space thereabove being filled with an adhesive filler, the top of said casing then being ground down to a predetermined distance above said coils.

4. A transducer according to claim 3, wherein said adhesive filler is an epoxy resin.

5. A transducer according to claim 1, wherein said sensing head coils are connected in a bridge circuit.

6. A transducer according to claim 5, wherein said proximity output means includes impedance means connected to sense the amount of current flowing through the bridge circuit.

7. A transducer according to claim 1, wherein further means are provided to combine said indicating and proximity signals to provide a further output signal indicative of whether the displacement member is present within a null region within said first said region and containing the said reference position.

8. A transducer according to claim 7, wherein said further combining means includes an AND-gate to which said proximity signal is supplied, and said differential output means is coupled to two detectors adapted to supply respective null limit output signals to respective inputs of said AND-gate such that said AND-gate generates said further output signal in response to the presence of both said null limit output signals together with said proximity signal.

* * * * *